(12) United States Patent
Rockwell et al.

(10) Patent No.: US 7,835,705 B2
(45) Date of Patent: Nov. 16, 2010

(54) INTEGRATED BIDIRECTIONAL JUNCTION ENGINEERED DUAL INSULATOR TRANSCEIVER

(75) Inventors: Stephen K. Rockwell, Mesa, AZ (US); Steven J. Franson, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 509 days.

(21) Appl. No.: 11/951,494

(22) Filed: Dec. 6, 2007

(65) Prior Publication Data

US 2009/0149137 A1    Jun. 11, 2009

(51) Int. Cl.
H04B 1/38    (2006.01)
(52) U.S. Cl. ............... 455/73; 455/78; 455/82; 455/83; 455/550.1
(58) Field of Classification Search .......... 455/73, 455/78, 82, 83, 550.1, 42, 295, 339, 306, 455/254
See application file for complete search history.

(56) References Cited

U.S. PATENT DOCUMENTS 5,821,813 A    10/1998    Batchelor et al.
6,534,784 B2   3/2003     Eliasson et al.
7,468,638 B1 * 12/2008    Tsai et al. ............... 331/126

OTHER PUBLICATIONS

Archer, J., et al., Bi-Directional Amplifiers for Half-Duplex Transceivers, 0-7803-5585 IEEE, Jul. 1999 pp. 251-254.

* cited by examiner

*Primary Examiner*—Tuan A Pham
(74) *Attorney, Agent, or Firm*—Ingrassia, Fisher & Lorenz, P.C.

(57) ABSTRACT

A bi-directional transceiver (100) having reduced circuitry and that may be formed on a non-semiconductor substrate includes impedance matching and filtering circuitry (114, 116, 122, 124, 128, 132) coupled to a non-linear diode (118) for converting a lower frequency modulated signal to a higher frequency RF transmit signal and to function as a square-law detector to envelope detect RF signals. The non-linear diode (118) includes, in one exemplary embodiment, at least two insulative layers disposed between two conductive layers, wherein a quantum well is formed between the insulators that allows only high-energy tunneling.

20 Claims, 3 Drawing Sheets

US 7,835,705 B2

INTEGRATED BIDIRECTIONAL JUNCTION ENGINEERED DUAL INSULATOR TRANSCEIVER

FIELD

The present invention generally relates to bidirectional communications and more particularly to transceivers used in bidirectional communications.

BACKGROUND

Typically, complex RF front ends have separate transmit and receive functions, which is accomplished by the use of separate antennas, separate transmit and receive frequencies, and a transmit/receive switch. Conventional transceivers typically have four amplifiers, an RF amplifier and an intermediate frequency amplifier in each of a transmit section and a receive section. Furthermore, typical front ends require assembling integrated circuit chips onto a packaging platform, involving expensive semiconductor based technologies, and assembly in flip chip form, for example, to another substrate resulting in interconnect repeatability and yield issues. Circuit complexity, silicon area, and cost are reduced by integrating the transmit section and the receive section in one circuit.

Simultaneous two-way transmission of information signals in the same frequency band is disclosed in U.S. Pat. No. 7,187,907, wherein a complex semiconductor based adaptive filtering and a cancellation technique allows for a simultaneous bidirectional communications link.

A bidirectional amplifier is disclosed in U.S. Pat. No. 5,821,813, wherein a coupler at the antenna separates signals to the mixer for demodulation and from a multiplier for transmission; however, a LO drive for the mixer is required.

However, known bidirectional transceivers require semiconductor technology. The active components in transmitters and receivers are based upon semiconductor technology, and typically require one integrated circuit or integrated circuit technology for the transmit section and another integrated circuit or integrated circuit technology for the receive section.

Accordingly, it is desirable to provide a bi-directional transceiver having reduced circuitry and that is capable of being formed on a non-semiconductor substrate. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Using a highly nonlinear diode such as a Schottky diode or the Junction Engineered Dual Insulator (JEDI) technology developed at the University of Colorado as described in U.S. Pat. No. 6,563,185, a single device can act both as an RF resistive multiplier to upconvert modulated signals to an antenna, and can also serve as a square-law detector or envelope detector to incoming RF signals. Through the use of JEDI technology, low cost, half-duplex, integrated RF front ends may be fabricated on these non-semiconductor substrates such as FR-4 boards or any material including, for example, quartz, ceramics, Teflon, polyimides, plastic, liquid crystal polymer, and epoxy. Improved performance is accomplished by eliminating or reducing lossy interconnects, and positioning the demodulator in the vicinity of the antenna.

The JEDI technology comprises nanoscale stacks of metals and insulators for creating ultra-high frequency diodes, antennas, and transistors operating at frequencies from DC to 3.0 THz. More specifically, a second layer of insulator and metal may be substituted for the semiconductor found in metal-oxide semiconductors, resulting in a four-layer stack of metal-insulator-insulator-metal (MIIM). A quantum well is formed between the insulators that allows only high-energy tunneling. Consequently, when a voltage is applied to the top metal that exceeds its threshold, a ballistic transport mechanism accelerates tunneling electrons across the insulator gap.

A single device is used in a bi-directional manner near a single antenna, using planar filters and is operated in a half-duplex mode to provide a simple RF front end that can be fully integrated on the RF board used for the antenna by the use of a thin film JEDI device providing the non-linear response to RF signals required for multiplication and detection.

Figure 1:
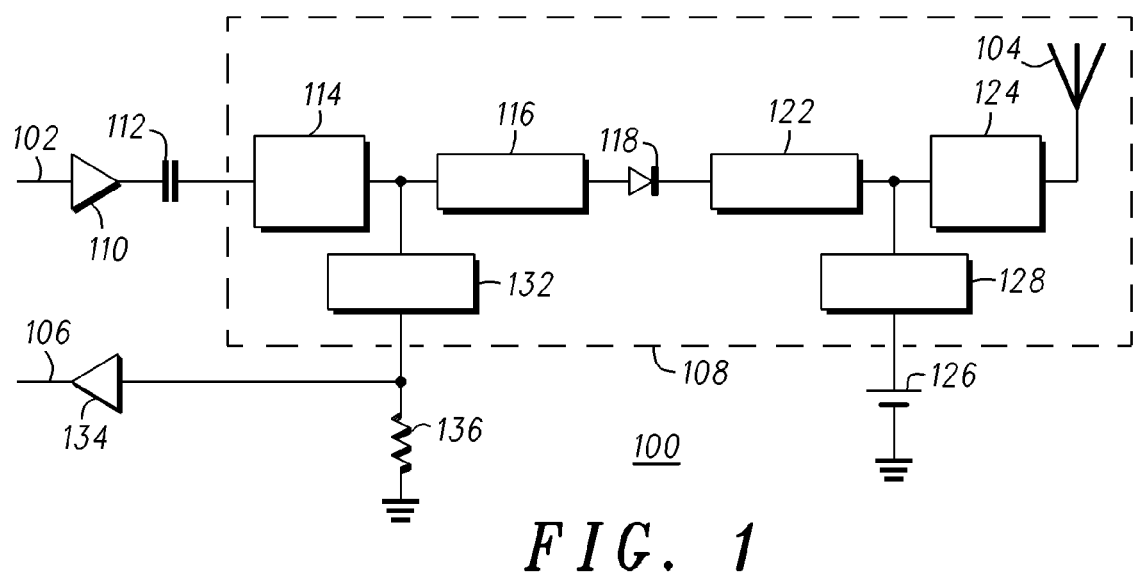
FIG. 1 is a transceiver in accordance with the exemplary embodiment.

Referring to FIG. 1, a bi-directional transceiver 100 includes a modulated transmit signal terminal 102, a modulated transmit/receive terminal 104, and a demodulated receive signal terminal 106. An amplifier 110 has an input coupled to the modulated transmit signal terminal 102, and an output coupled to an integrated planar substrate 108 by a capacitor 112. An input signal having a frequency, for example in the range of 1.0 Ghz to 100.0 Ghz, but preferably of approximately 30 Ghz, may be applied to the modulated transmit signal terminal 102. The integrated planar substrate 108 comprises a low frequency material, such as a printed circuit board of FR-4 material.

Figure 2:
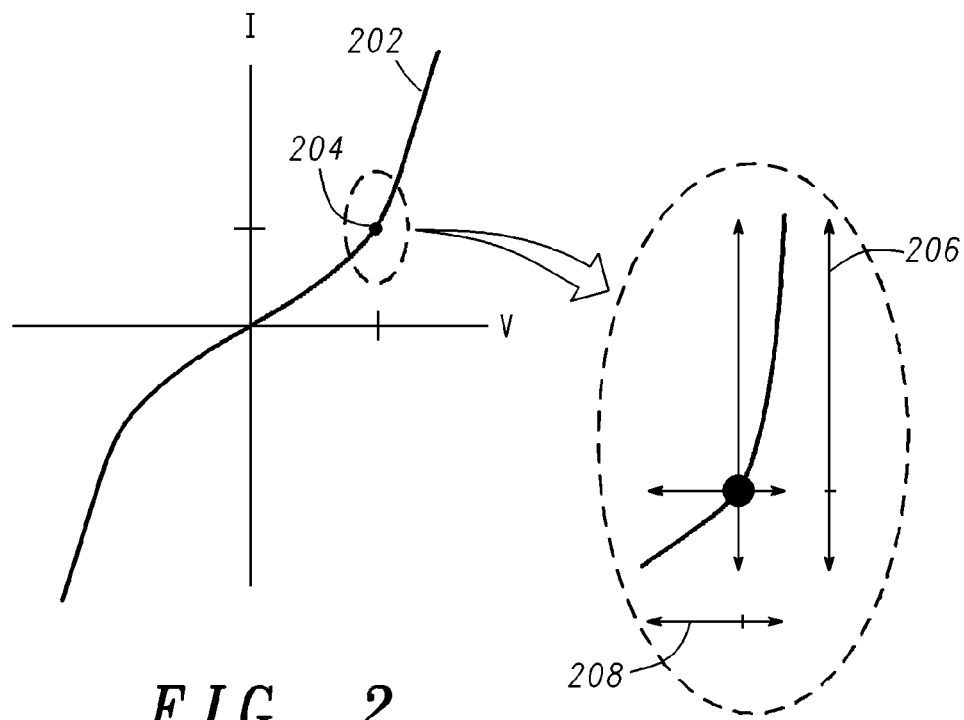
FIG. 2 is a graph of the current-voltage (I/V) characteristic of a representative nonlinear diode showing the time varying resistance necessary for both the transmit and receive mode of the exemplary embodiment.

In the transmit mode, the signal from the capacitor 112 is filtered by a band pass filter 114 and is matched to the diode 118 by matching circuitry 116. The diode 118 is chosen to have a nonlinear I/V characteristic which, when excited by signals of sufficient amplitude, will distort the waveform and generate harmonic frequencies. The nonlinear characteristic is resistive in nature. In other words, as an applied RF signal 202 (FIG. 2) swings across the I/V characteristic of the diode 118, the effective resistance is changing in a time varying manner producing a nonlinear distortion in the time domain waveform. It is noted the anode and cathode of the diode 118 may be reversed in the circuit, but may require a different biasing scheme. FIG. 2 shows a representative I/V characteristic with the applied RF signal producing an asymmetric swing due to the nonlinearity of the diode 118. As the RF signal 202 applied to the diode 118, the point on the I/V curve 202 will move back and forth along the curve 202 from the quiescent operating point 204. This may be seen by the graphical representation of the asymmetric current movement 206 and the asymmetric voltage movement 208.

Figure 3:
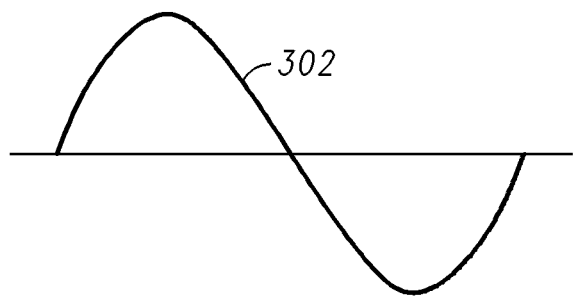
FIG. 3 is a representative time domain signal before distortion is introduced in a nonlinear diode within the exemplary embodiment.
Figure 4:
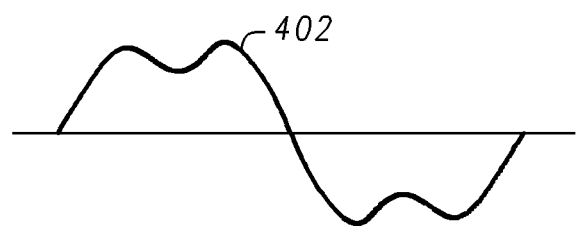
FIG. 4 is a representative time domain signal after distortion is introduced in a nonlinear diode within the exemplary embodiment
Figure 5:
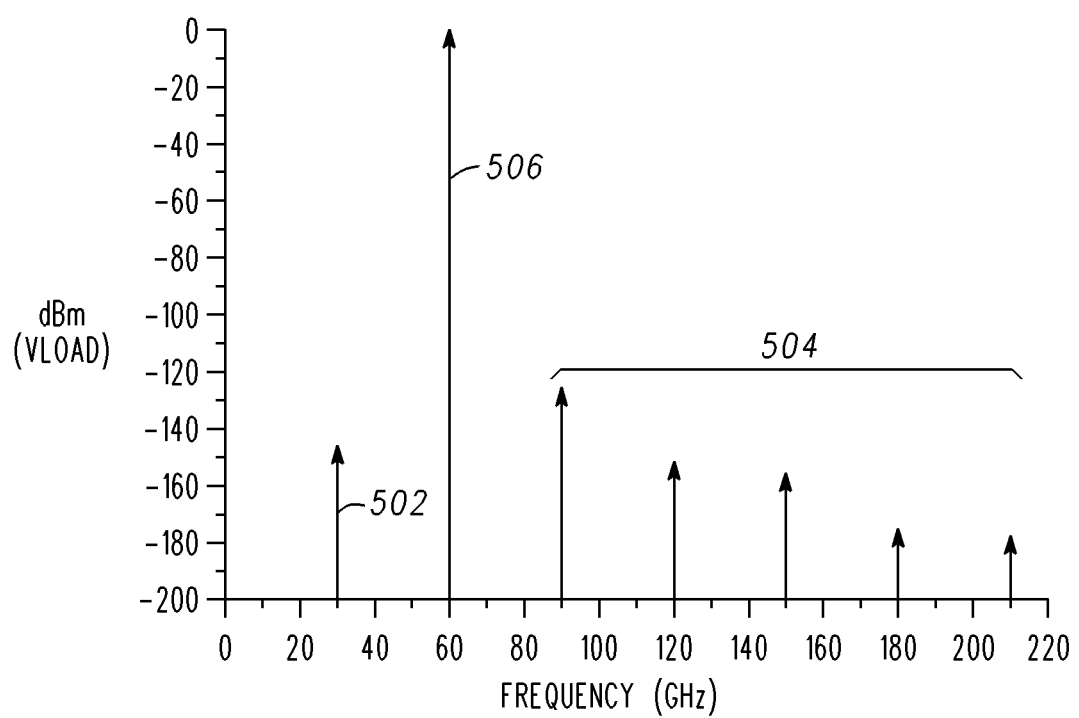
FIG. 5 is the spectral output of typical multiplier implementation.
Figure 6:
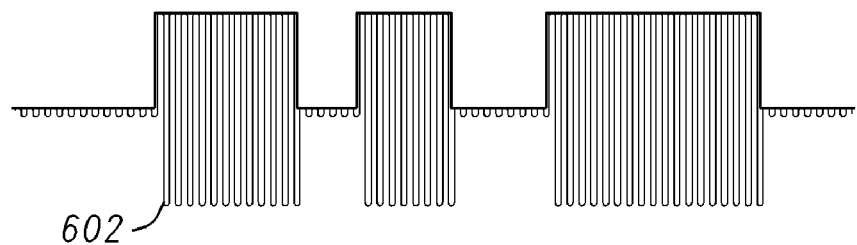
FIG. 6 is a typical output from an envelope detector.

FIG. 3 shows an exemplary time domain waveform 302 before distortion, and FIG. 4 shows an exemplary time domain waveform 402 after distortion introduced by the diode 118 nonlinearity. This type of distortion produces frequency domain components at harmonics of the applied RF frequency. By designing the matching 116, 122 and filter 114, 124 circuits to optimize the desired harmonic frequency (usually the $2^{nd}$ harmonic), a frequency multiplier is produced. An example of the multiple harmonic signal 402 from the diode is represented by the graph in FIG. 5. The input signal 302, 502 and higher harmonic signals 504 are minimized, while the second harmonic signal 506 is maximized. Note the second harmonic signal 506 is at 60 GHz, twice the frequency of the input signal 502. FIG. 6 shows a representative frequency domain spectral output. The output signal from the diode 118 is impedance matched to the filter and antenna at the desired frequency by a matching circuit 122 and undesired frequencies are filtered by the band pass filter 124 centered at the desired output frequency. A DC ground return path or bias voltage 126, may be applied through a low pass filter/RF choke circuit 128. Some diode devices may perform better or provide some tunability through use of an applied bias.

The transmit signal is preferably coupled to an on-board planar antenna 104 (FIG. 1) integrated onto the substrate 108, although an off-board antenna (not shown) may be used. Without further transmit amplification, this type of transmit topology is most useful where low transmit powers are acceptable such as for short range point to point communications. While the substrate may be a semiconductor material, it preferably is a non-semiconductor material, for example, including at least a portion selected from one of the group consisting of quartz, ceramics, Teflon®, polyimides, plastic, liquid crystal polymer, and epoxy.

Figure 7:
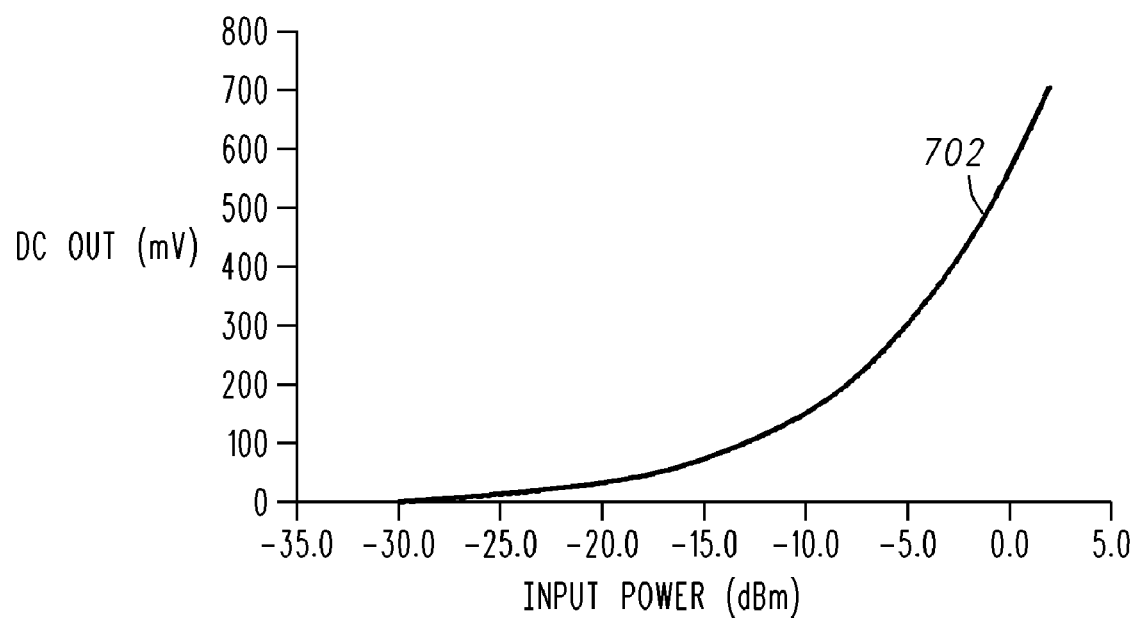
FIG. 7 is a typical responsivity performance of nonlinear diode.

In the receive mode, an amplitude modulated signal can be demodulated by using the diode 118 as square law or envelope detector. FIG. 6 illustrates an example of this type of detection. The signal 602 received at terminal 104 is filtered through the same pass band filter 124 used in transmission. The signal to the diode 118 is optimized by the same matching circuit 122 used in transmit mode. The impedance matching between the diode 118 and the filter 124 optimizes both the transmit and receive functions. The impedance matching between the diode 118 and the lower frequency filter 114 on the transmit side optimizes the transmit function and does not impact the receive function. The same nonlinear diode 118 characteristics which enable frequency multiplication enable direct detection of amplitude modulated carrier frequencies. The incident RF signal is converted to a DC signal proportional in amplitude to the power absorbed from the RF signal. FIG. 7 illustrates a typical diode detector responsivity curve 702. The low pass filter/RF choke 132 removes the carrier frequency and passes the modulated baseband signal to the load resistor 136. The DC voltage generated by the detector can be increased by increasing the impedance load on the diode, but at the expense of the video bandwidth, which is related to the time constant of the load impedance in series with the diode capacitance. If the impedance looking into the baseband amplifier 134 is high, the impedance is set primarily by the load resistor 136. The signal is then applied to the baseband amplifier 134 which amplifiers the detected signal for processing by the baseband circuitry (not shown).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A bi-directional transceiver comprising:
    a modulated transmit signal terminal;
    a modulated transmit/receive terminal;
    a demodulated receive signal terminal;
    first impedance matching circuitry;
    a first filter coupled between the modulated transmit/receive terminal and the first impedance matching circuitry;
    a second filter coupled between a bias potential source and a node between the first filter and the first impedance matching circuitry; and
    a non-linear diode coupled between the first impedance matching circuitry and both the modulated transmit signal terminal and the demodulated receive signal terminal.

2. The bi-directional transceiver of claim 1 wherein the non-linear diode comprises a nanoscale stack of a plurality of conductive layers and a plurality of insulative layers.

3. The bi-directional transceiver of claim 1 wherein the non-linear diode functions as an RF resistive multiplier to upconvert modulated signals to an antenna, and a square-law detector to envelope detect incoming RF signals.

4. The bi-directional transceiver of claim 1 wherein the non-linear diode comprises at least two insulative layers disposed between two conductive layers, wherein a quantum well is formed between the insulators that allows only high-energy tunneling.

5. The bi-directional transceiver of claim 1 further comprising:
    a third filter coupled to the modulated transmit signal terminal;
    second impedance matching circuitry coupled between the third filter and the non-linear diode; and
    a fourth filter coupling a bias potential source and the demodulated receive signal terminal to a node between the third filter and the second impedance matching circuitry.

6. The bi-directional transceiver of claim 5 further comprising a non-semiconductor substrate on which the non-linear diode, antenna, first filter, second filter, third filter, fourth filter, first impedance matching circuitry, and second impedance matching circuitry are disposed.

7. The bi-directional transceiver of claim 6 wherein the substrate material includes at least a portion selected from one of the group consisting of quartz, ceramics, Teflon, polyimides, plastic, liquid crystal polymer, epoxy.

8. A bi-directional transceiver comprising:
    an antenna;
    first impedance matching circuitry;

a first filter coupled between the antenna and the first impedance matching circuitry;

a second filter coupled between a bias potential source and a node between the first filter and the first impedance matching circuitry; and a non-linear diode coupled to the first impedance matching circuitry and configured for converting a lower frequency modulated signal to a higher frequency RF transmit signal and to function as a square-law detector to envelope detect RF signals.

9. The bi-directional transceiver of claim 8 wherein the non-linear diode comprises a nanoscale stack of a plurality of conductive layers and a plurality of insulative layers.

10. The bi-directional transceiver of claim 8 wherein the non-linear diode functions as an RF resistive multiplier to upconvert modulated signals to an antenna, and a square-law detector to envelope detect incoming RF signals.

11. The bi-directional transceiver of claim 8 wherein the non-linear diode comprises at least two insulative layers disposed between two conductive layers, wherein a quantum well is formed between the insulators that allows only high-energy tunneling.

12. The bi-directional transceiver of claim 8 further comprising:

a third filter coupled to the modulated transmit signal terminal;

second impedance matching circuitry coupled between the third filter and the non-linear diode;

a fourth filter coupling a bias potential source and the demodulated receive signal terminal to a node between the third filter and the second impedance matching circuitry.

13. The bi-directional transceiver of claim 12 further comprising a non-semiconductor substrate on which the non-linear diode, antenna, first filter, second filter, third filter, fourth filter, first impedance matching circuitry, and second impedance matching circuitry are disposed.

14. The bi-directional transceiver of claim 13 wherein the substrate material includes at least a portion selected from one of the group consisting of quartz, ceramics, Teflon, polyimides, plastic, liquid crystal polymer, epoxy.

15. A bi-directional transceiver comprising:

a modulated transmit signal terminal for receiving a first signal to be transmitted;

a modulated transmit signal terminal for transmitting the first signal and for receiving a second signal;

a demodulated receive signal terminal for providing the second signal;

a non-linear diode;

a first band pass filter coupled between the modulated transmit signal terminal and the non-linear diode;

a second band pass filter coupled between the non-linear diode and the modulated transmit signal terminal;

a first low pass filter coupled between the demodulated receive signal terminal and a node between the modulated transmit signal terminal and the first band pass filter; and a second low pass filter coupled to a node between the non-linear diode and the second band pass filter, and configured to be coupled to receive a bias voltage.

16. The bi-directional transceiver of claim 15 wherein the non-linear diode comprises a nanoscale stack of a plurality of conductive layers and a plurality of insulative layers.

17. The bi-directional transceiver of claim 15 wherein the non-linear diode functions as an RF resistive multiplier to upconvert modulated signals to an output, and a square-law detector to envelope detect incoming RF signals.

18. The bi-directional transceiver of claim 15 wherein the non-linear diode comprises at least two insulative layers disposed between two conductive layers, wherein a quantum well is formed between the insulators that allows only high-energy tunneling.

19. The bi-directional transceiver of claim 15 further comprising a non-semiconductor substrate on which the non-linear diode, antenna, first band pass filter, second band pass filter, first low pass filter, and second low pass filter are disposed.

20. The bi-directional transceiver of claim 19 wherein the substrate material includes at least a portion selected from one of the group consisting of quartz, ceramics, Teflon, polyimides, plastic, liquid crystal polymer, epoxy.

* * * * *

UNITED STATES PATENT AND TRADEMARK OFFICE
CERTIFICATE OF CORRECTION

| | |
|---|---|
| PATENT NO. | : 7,835,705 B2 |
| APPLICATION NO. | : 11/951494 |
| DATED | : November 16, 2010 |
| INVENTOR(S) | : Rockwell et al. |

It is certified that error appears in the above-identified patent and that said Letters Patent is hereby corrected as shown below:

ON THE FACE PAGE

On the Face Page, in Field (56), under "OTHER PUBLICATIONS", in Column 2, Line 2, delete "1999" and insert -- 1999, --, therefor.

IN THE SPECIFICATION

In Column 1, Line 54, delete "drawing figures," and insert -- figures, --, therefor.

In Column 1, Line 67, delete "embodiment" and insert -- embodiment; --, therefor.

Signed and Sealed this
Twenty-ninth Day of May, 2012

David J. Kappos
*Director of the United States Patent and Trademark Office*